Patented Mar. 26, 1940

2,194,784

UNITED STATES PATENT OFFICE 2,194,784

HEAT-ABSORBING GLASS

Edwin Berger, Jena, Germany, assignor to Jenaer Glaswerk Schott & Gen., Jena, Germany No Drawing. Application July 8, 1937, Serial No. 152,565. In Germany July 13, 1936

6 Claims. (Cl. 106—36.1)

The heat-absorbing glasses described and claimed in specification of U. S. Patent 1,961,603 can be obtained by melting either under reducing or under oxidation conditions, the said specification recommending especially the former method. Further examinations have proved, however, that, eventually, the better results are yielded by oxidation melting, since glasses containing much phosphoric acid are generally rather liquid already at lower temperatures and very prone to crystallize, and because it is difficult to submit such glasses to the blow-pipe treatment. The said disadvantages can be overcome by adding to the batch of these glasses silicic acid, which, however, reduces the resistance against atmospheric influences. This unfavourable effect of silicic acid can be counteracted by adding also lead oxide or antimony oxide, or both, in any suitable form, the introduction of antimony oxide being especially favourable. Such reducible oxides can be introduced, however, only if the melting is effected by oxidation. Effects similar to those of antimony oxide or lead oxide can be obtained as well by other oxides which entail in melting by reduction a blackening or clouding of the glasses.

If importance is attached to both strong absorption of heat and good permeability as regards the visible rays, it is advisable to limit the content of boric acid in the glasses to 10%, since a higher content of boric acid can entail in the oxidation method a reduction of the heat absorption and the permeability in the visible region of the spectrum.

There may be added that the introduction of reducible oxides can be used also for considerably increasing the refractive index of the glasses.

As the oxidation process generally reduces permeability with respect to ultra-violet rays, and does not affect permeability as regards the visible rays, the new glasses are especially suitable for spectacle use, protecting as they do the eye from all detrimental invisible rays. If also the visible light is desired to be damped, this purpose can be achieved by increasing accordingly the content of boric acid or by adding a dyeing substance, for instance titanium oxide.

The following table shows some examples of the new glasses:

| | | |
|---|---|---|
| $P_2O_5$ | 53.0 | 53.5 |
| $SiO_2$ | 27.0 | 27.0 |
| $Al_2O_3$ | 13.0 | 13.0 |
| CaO | 0.4 | 0.4 |
| BaO | 0.6 | 0.6 |
| $Sb_2O_3$ | 6.0 | ---- |
| PbO | ---- | 5.0 |
| $As_2O_3$ | ---- | 0.5 |
| Fe | 1.3 | 1.3 |

In this table, Fe designates ferrous oxides or iron combinations in a quantity which, when converted to elementary iron, corresponds in 100 parts of glass to the content stated at Fe.

I claim:

1. A heat absorbing glass containing at least 0.2% of ferrous oxide, phosphoric acid and boric acid, the total of phosphoric acid and boric acid amounting to at least 25%, the said glass further containing at least 1% of reducible oxides.

2. A heat absorbing glass containing at least 0.2% of ferrous oxide, phosphoric acid and boric acid, the total of phosphoric acid and boric acid amounting to at least 25%, the said glass further containing at least 1% of antimony oxide.

3. A heat absorbing glass containing at least 0.2% of ferrous oxide, phosphoric acid and boric acid, the total of phosphoric acid and boric acid amounting to at least 25%, the said glass further containing at least 1% of lead oxide.

4. A heat absorbing glass containing at least 0.2% of ferrous oxide, phosphoric acid and boric acid, the content of boric acid amounting to at most 10%, and the total of phosphoric acid and boric acid amounting to at least 25%, the said glass further containing at least 1% of reducible oxides.

5. A spectacle lens consisting of glass according to claim 1.

6. A spectacle lens consisting of glass according to claim 1 and containing colorizing ingredients for damping the visible light.

EDWIN BERGER.